United States Patent
Ellis et al.

(10) Patent No.: US 7,873,428 B2
(45) Date of Patent: Jan. 18, 2011

(54) AUTOMATED JOB MANAGEMENT

(75) Inventors: Ray Ellis, Austin, TX (US); Evzen Wagner, Austin, TX (US)

(73) Assignee: PEER Intellectual Property, Inc., Kitchener (CA)

( * ) Notice: Subject to any disclaimer, the term of this patent is extended or adjusted under 35 U.S.C. 154(b) by 1059 days.

(21) Appl. No.: 11/107,508

(22) Filed: Apr. 15, 2005

(65) Prior Publication Data

US 2006/0235554 A1    Oct. 19, 2006

(51) Int. Cl.
*G06F 19/00* (2006.01)
*G06F 15/16* (2006.01)
*G06F 15/173* (2006.01)

(52) U.S. Cl. .......................... 700/96; 700/95; 700/121; 709/203; 709/227; 709/223

(58) Field of Classification Search ................... 700/96, 700/121, 117, 95; 709/203, 227, 223
See application file for complete search history.

(56) References Cited

U.S. PATENT DOCUMENTS

| | | | |
|---|---|---|---|
| 4,698,766 A | 10/1987 | Entwistle et al. | |
| 5,291,416 A | 3/1994 | Hutchins | |
| 5,432,702 A | 7/1995 | Barnett | |
| 5,453,933 A | 9/1995 | Wright et al. | |
| 5,592,600 A | 1/1997 | De Pauw et al. | |
| 5,805,442 A | 9/1998 | Crater et al. | |
| 5,809,028 A | 9/1998 | Nethercott et al. | |
| 5,826,040 A | 10/1998 | Fargher et al. | |

(Continued)

FOREIGN PATENT DOCUMENTS

EP    0 620 631    3/1994

(Continued)

OTHER PUBLICATIONS

Campbell Boyd, "Tcl/Tk based Equipment Station Control in a Semiconductor Wafer Fabrication Area", May 23, 2002, 3rd European Tcl/Tk User Conference, 28 pages.*

(Continued)

*Primary Examiner*—Albert DeCady
*Assistant Examiner*—Sunray R Chang
(74) *Attorney, Agent, or Firm*—Martine Penilla & Gencarella, LLP

(57) ABSTRACT

A method and apparatus are disclosed for improving the implementation of automated job management for equipment in a factory. A software library is provided that allows a job management client, such as a thin station controller client, to communicate with an equipment server, such as an equipment interface bridge (EIB). The job management client can create, control and monitor jobs conveniently and efficiently utilizing industry standard protocols. The equipment server communicates directly in real-time with factory equipment. By providing an interface between a job management client and an equipment server, data consumer clients are effectively decoupled from job management clients, allowing next generation station controllers for monitoring and controlling equipment processing to be easily implemented. Layers of expensive and complex code currently in use for job management can be replaced with a superior and cost-effective thin-client, distributed architecture. Such a system may operate in conjunction with legacy station controllers, or the station controller can be eliminated and replaced by multiple modules that distribute the many types of functions typically incorporated into conventional station controllers.

13 Claims, 2 Drawing Sheets

U.S. PATENT DOCUMENTS

| | | | |
|---|---|---|---|
| 5,847,957 | A | 12/1998 | Cohen et al. |
| 5,948,063 | A | 9/1999 | Cooper et al. |
| 5,961,588 | A | 10/1999 | Cooper et al. |
| 5,987,135 | A | 11/1999 | Johnson et al. |
| 6,016,516 | A | 1/2000 | Horikiri |
| 6,021,331 | A | 2/2000 | Cooper et al. |
| 6,094,678 | A | 7/2000 | Nethercott et al. |
| 6,167,451 | A | 12/2000 | Stracke, Jr. |
| 6,198,480 | B1 | 3/2001 | Cotugno et al. |
| 6,201,996 | B1 | 3/2001 | Crater et al. |
| 6,332,163 | B1 | 12/2001 | Bowman-Amuah |
| 6,349,341 | B1 | 2/2002 | Likes |
| 6,370,448 | B1 | 4/2002 | Eryurek |
| 6,418,214 | B1 | 7/2002 | Smythe et al. |
| 6,418,352 | B1 | 7/2002 | Ellis et al. |
| 6,421,682 | B1 | 7/2002 | Craig et al. |
| 6,463,352 | B1 | 10/2002 | Tadokoro et al. |
| 6,470,227 | B1 | 10/2002 | Rangachari et al. |
| 6,535,779 | B1 | 3/2003 | Birang et al. |
| 6,549,199 | B1 | 4/2003 | Carter et al. |
| 6,549,937 | B1 | 4/2003 | Auerbach et al. |
| 6,553,403 | B1 | 4/2003 | Jarriel et al. |
| 6,615,091 | B1 | 9/2003 | Birchenough et al. |
| 6,618,425 | B1 | 9/2003 | Carlesi et al. |
| 6,640,151 | B1 | 10/2003 | Somekh et al. |
| 6,658,571 | B1 | 12/2003 | O'Brien et al. |
| 6,681,145 | B1 | 1/2004 | Greenwood et al. |
| 6,708,223 | B1 | 3/2004 | Wang et al. |
| 6,826,439 | B1 | 11/2004 | Barber et al. |
| 6,832,120 | B1 | 12/2004 | Frank et al. |
| 6,842,660 | B2 | 1/2005 | Tripathi et al. |
| 6,944,584 | B1 | 9/2005 | Tenney et al. |
| 7,031,783 | B2 | 4/2006 | O'Grady et al. |
| 7,053,767 | B2 | 5/2006 | Petite et al. |
| 7,069,101 | B1 | 6/2006 | Arackaparambil et al. |
| 7,127,320 | B1 * | 10/2006 | Brown et al. ............... 700/121 |
| 2002/0026514 | A1 | 2/2002 | Ellis et al. |
| 2003/0134590 | A1 | 7/2003 | Suda et al. |
| 2005/0075748 | A1 * | 4/2005 | Gartland et al. ............ 700/108 |
| 2005/0136560 | A1 * | 6/2005 | Helwig ..................... 438/14 |
| 2006/0047356 | A1 * | 3/2006 | Funk et al. ................ 700/121 |
| 2008/0071415 | A1 * | 3/2008 | Hshieh et al. ............. 700/121 |

FOREIGN PATENT DOCUMENTS

| | | |
|---|---|---|
| EP | 0 747 795 | 6/1996 |
| WO | WO 95/34866 | 12/1995 |
| WO | WO 01/57823 | 8/2001 |

OTHER PUBLICATIONS

Shaopeng Wang et al: "Enabling robustness and flexibility of equipment data collection through SEMI EDA standards" Advanced Semiconductor Manufacturing, 2004 ASMC '04. IEEE Conference and Workshop Boston, MA, USA May 4-6, 2004, Piscataway, NJ, USA, IEEE, US, May 4, 2004, pp. 165-169, XP010768986; ISBN: 0-7803-8312-5; figures 1, 5; Sections "Common Equipment Model" and "Integration".

Semi E-37-0298; High-Speed SECS Message Services (HSMS) Generic Services (1998), pp. 1-24.

Semi E4-0699; Semi Equipment Communications Standard 1 Message Transfer (SECS-I) (1999), pp. 1-20.

Semi E30-0299; Generic Model for Communications and Control of Semi Equipment (GEM) (1992), pp. 1-76.

Semi E5-0699; Semi Equipment Communication Standard 2 Message Content (SECS-II) (1999), pp. 1-240.

* cited by examiner

AUTOMATED JOB MANAGEMENT

BACKGROUND OF THE INVENTION

The present invention relates to the field of automated job management, and in particular the monitoring and control of equipment processing in a semiconductor fabrication facility.

Semiconductor chip manufacturing does not typically enjoy the high level of automation that other technology sectors do. In various areas of a semiconductor chip manufacturing factory, the systems and tools are often only semi-integrated or even completely independent. Furthermore, because of the proprietary communication protocols that are typically used, it is often very difficult to automate the manufacturing process in a way that not only coordinates the activity between the tools, but also collects data from the tools in a fashion that is usable for process improvements and other job management functions.

In a typical configuration, tools are grouped together and loosely controlled by a monolithic software program known as a "station controller." A typical station controller communicates with either an individual tool or a group of tools using an industry standardized interface known as SECS/GEM. SECS/GEM is present on most tools using 300 mm silicon wafers to produce semiconductor chips, and is also the standard communication interface in factories where 200 mm wafers are used. The needs of 300 mm and 200 mm factory types are very different, but both typically use a station controller in certain parts of their operations.

Current software architectures implementing station controllers have severe restrictions, in particular with respect to integration among semiconductor manufacturing tools and the way that data about tool actions and status is handled. Where there is a need for the equipment to provide real-time data directly from the tools to other software applications for the purpose of manufacturing process analysis, diagnosis, and quickly implemented corrective actions, the current software architectures used to integrate and extract data from the tools has many design impediments to overcome.

One limitation is that the legacy solutions in place currently collect data from semiconductor equipment that is managed by station controllers using a single client SECS/GEM communication protocol. Thus, only a single client can communicate with each tool and the available data set is driven by data availability in the SECS/GEM interface specification. The SECS/GEM interface does not reveal the structure of the equipment, making it impossible to determine the physical makeup of equipment. In addition, SECS/GEM is not a discoverable interface, so applications cannot query the equipment to determine its capabilities. Also, SECS/GEM has no security mechanism, so there is no concept of client authorization and access permissions in SECS/GEM. Finally, the single client limitation means that there is no support for simultaneous multi-client access to equipment information.

Another fundamental problem present in current station controllers is higher complexity as a result from a drift from the primary function of controlling material processing. As multiple functions have been incorporated on top of core job management needs, large and complex software architectures have been created that are not easily adaptable to change. This also results in a single point of failure with multiple internal failure points and a high cost of ownership. Because data collection has typically be integrated with job management, current station controllers have become the sole collectors of equipment data, requiring data consumers to interface through the station controllers.

The changes in the semiconductor industry that have mandated that semiconductor manufactures implement efficient automation integration strategies is primarily attributed to the resulting exponential increase in manufacturing data that must be managed as circuit capacity increase with 300 mm wafers and beyond, in parallel with reductions in geometry size which are now focused on 45 nm and below. In addition to the above drivers for change, several other pressures are magnifying the need for change. First, a need exists to focus a small number of expert resources on solving issues, and to reduce the resources spent on merely finding data. Also, the high cost of mis-processing wafers at 45 nm, where each wafer consists of 100's to 1000's of die, has made the need for efficient solutions more acute. There are also performance issues that are driving the need for efficient solutions, such as the high cost of equipment downtime and the desire to improve overall equipment effectiveness (OEE). There is also a need for real-time data to allow faster response to processing issues and a need to improve the tool to production time.

Current solutions will not solve the data access requirements for applications such as e-Diagnostics and Advanced Process Control (APC) that require the ability for automation architectures to support concurrent multi-client access to equipment and independent of the current ownership of equipment processing control. The ability to implement "data on demand" is a driving factor in the next generation of semiconductor focused station controller architectures. As the industry moves from lot based to wafer level manufacturing, automation solutions will need to be able to provide advanced statistical process control (SPC), fault detection classification and run-to-run control applications required to make effective manufacturing and business decisions to meet the demands of their customers.

For the reasons stated above, the typical station controller has become an impediment. Where once the station controller was designed to specifically control management of manufacturing jobs, now the station controller has evolved into an intricately intertwined set of programs whose functions have expanded as much as its complexity. This complexity makes maintenance or changes to the station controller, as well as to its fundamental functions such as job management, very difficult, time consuming and expensive. In some cases the overlapping and intertwined nature of the software code makes factory managers very hesitant to make any changes, even if they would result in manufacturing process improvements that are required in order to increase the output yields of operating semiconductor chips.

BRIEF SUMMARY OF THE INVENTION

The present invention solves the problems with existing station controllers primarily by creating a new module, separate and distributed away from the legacy station controller, that performs the primary function for which the station controller was originally designed: job management and control.

In one aspect of the present invention, a software library is provided that enables the next generation of station controllers to be implemented. In particular, a thin station controller client can be created that communicates with an equipment server and is dedicated to the monitoring and control of equipment processing. The thin station controller client communicates with an equipment server, which in turn communications with tools. Industry standard communication protocols can be supported, and a multi-client distributed architecture can be supported.

In another aspect of the present invention, a method for job management and control is provided. In particular, a thin station controller client receives job configuration information and communicates with an equipment server. The equipment server may implement a job factory and stores job instances that provide real-time job status information to the thin station controller client. The equipment server implements a tool model that separates the thin station controller client from direct communication with tools and allows other clients to communicate with tools.

DETAILED DESCRIPTION

Figure 1:
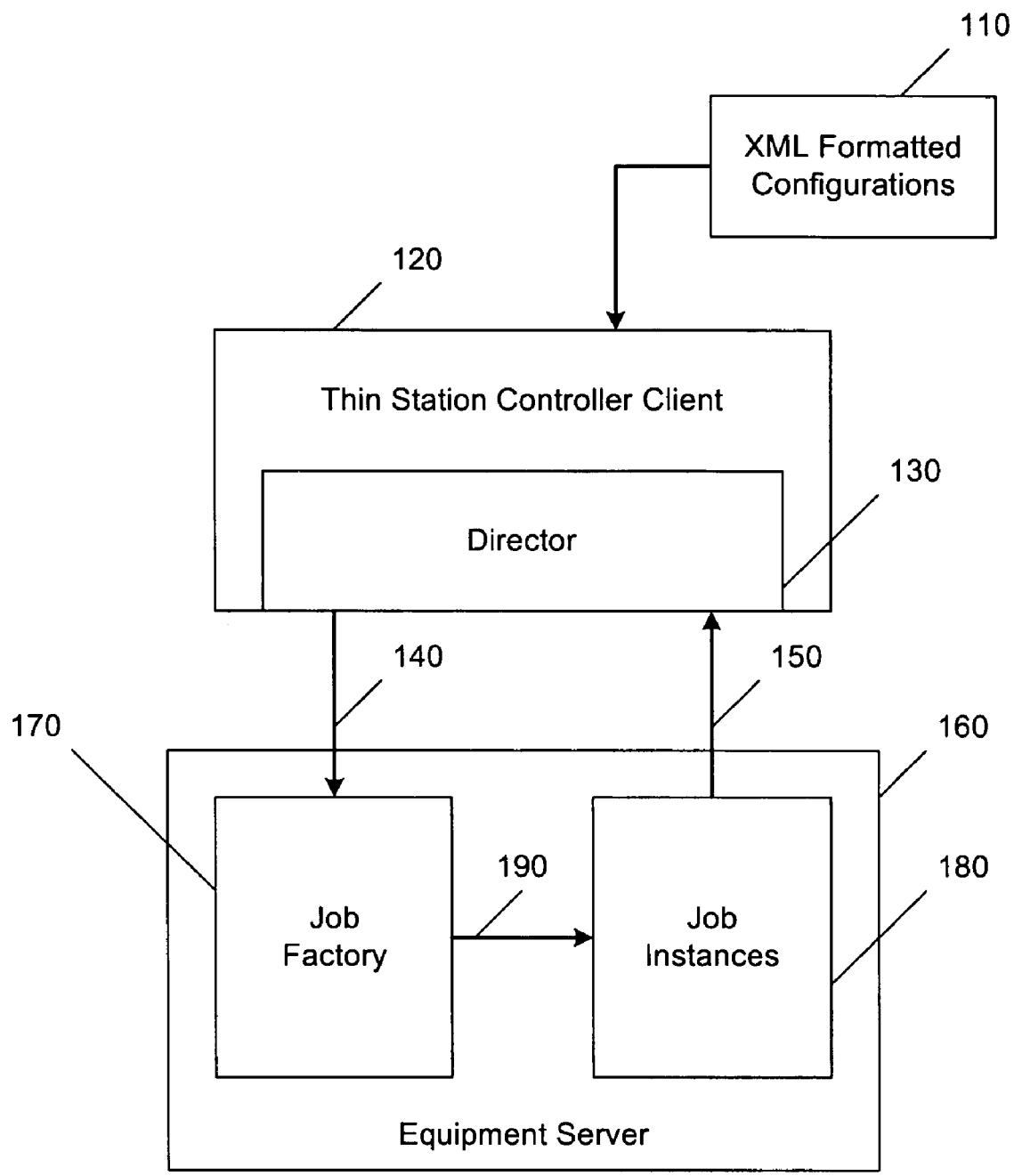
FIG. 1 illustrates the flow of job creation and management for use with an embodiment of the present invention.

The present invention, in conjunction with an equipment server, provides solutions to many of the hurdles being faced by those implementing station controller solutions in today's semiconductor facilities. A thin station controller client in accordance with the present invention connects to a manufacturing tool or group of tools using a different interface than SECS/GEM, which allows operation without interfering with the legacy station controller. An example of an equipment server for use with the present invention is the Equipment Interface Bridge (EIB), offered by Asyst Technologies, Inc. Asyst Director offered by Asyst Technologies, Inc. is an embodiment of a library for use in creating a job management client in accordance with the present invention.

A thin station controller client implemented in accordance with the present invention communicates through an advanced communications software layer that allows more flexibility in connecting to tools as well as in acquiring data from tools. In this case, it means that the legacy station controller can remain in place while the thin station controller client operates, or the station controller can be completely disassembled into several modules that distribute the many types of functions inefficiently compressed into the legacy station controller into new stand-along components. The architecture of the present invention provides the advantages of using the non-intertwined, open-architected solution to implementing station controller functionality that will work in conjunction with an equipment server.

In this way, the thin station controller client and the equipment server revolutionizes the approach to semiconductor factory automation by distributing as an independent and flexible client, part of the functionality previously intertwined in the legacy station controller. The presence of an equipment server enables the use of multiple distributed clients with specific functionality such as a job management, database management, and equipment performance tracking. The thin station controller client implements a job management client whose function is to manage and run jobs that are concerned with processing a group of semiconductor chip material.

There are many advantages of the architecture of the present invention over conventional station controllers. First, the use of distributed client applications is facilitated. The equipment server decouples the tool to server communication from the client to server communication. Thus, unlike the multi-function, multi-application legacy station controllers, a thin station controller client dedicated exclusively to job management can be created. Meanwhile, other clients, such as those dedicated to data collection and analysis can similarly be created and can interact directly with the equipment server without involving the thin station controller client. Data collection is effectively decoupled from job management.

This separation of function into multiple distributed clients eliminates the crippling dependences non-job management applications have on data provided by station controllers. Thus, the thin client station controller is no longer the sole collector of equipment data and therefore the cost of developing, implementing and maintaining job management solutions is reduced. Only those issues that directly affect job management and control need be addressed by the thin client station controller. Another advantage of the separation of job management from data collection functions is that a single point of failure in the form of the legacy station controller has been replaced with a more easily diagnosable multiple potential failure points that are not intertwined together.

FIG. 1 illustrates job flow in an embodiment of the present invention. XML Formatted Configurations 110 are used as input to the Thin Station Controller Client 120. These configurations specify the startup and runtime behavior of jobs. Director 130 is a software library utilized by Client 120. Director 130 implements a full featured Application Programming Interface (API) for creating and managing jobs. In a preferred embodiment, Director 130 implements Create Job and Run Job services, and supports Job State Change Events. Client 120 uses the Create Job service to create a job based on the XML Formatted Configurations 110. The Run Job service is used to start job execution. Any time the job state changes, Director 130 communicates the event to Client 120 in the form of a Job State Change Event.

Equipment Server 160 implements Job Factory 170 and contains Job Instances 180. XML job requests, recipes and instructions are communicated from Director 130 to Job Factory 170 via the communication path 140. Job Factory 170 contains job definitions and primitives. In an alternative embodiment the communication with Job Factory 170 supports the SEMI E40 standard for process job management. When it is time for a job to be run, jobs are instantiated via an internal communication path 190 and individual job instances are created in Job Instances 180. Real-time job state change events are communicated via communication path 150 to Director 130. Job state change events provide the ability for Client 120 to implement real-time process improvement. In a alternative embodiment, communication path 150 supports the SEMI E94 standard for Control Job Management.

Figure 2:
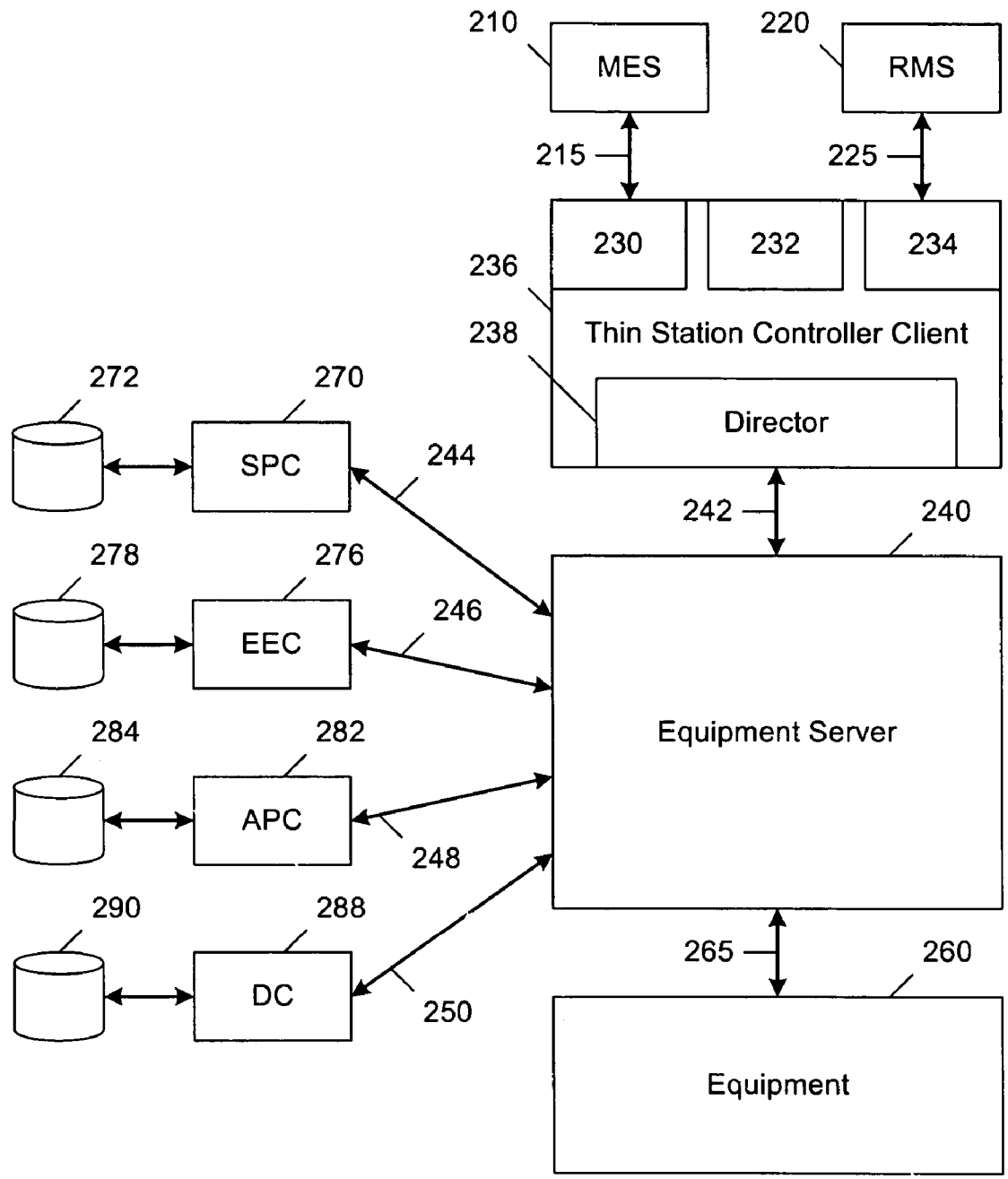
FIG. 2 illustrates an embodiment of the present invention in conjunction with other factory equipment.

FIG. 2 illustrates an embodiment of the present invention as it could be employed in a factory in conjunction with other equipment. Thin Station Controller Client 236 incorporates Director 238, MES Handler 230, Equipment Handler 232 and Recipe Handler 234 to implement a automated job management solution independent of any data consumers. Client 236 communicates with Manufacturing Execution System (MES) 210 and Recipe Management System (RMS) 220 via communication paths 215 and 225 respectively.

The interface between Client 236 and Director 238 is an easy to use application programming interface (API) for creating and managing jobs and is based on the use of industry standard technologies, such as XML, to reduce complexity and the learning curve of using the system. This allows the Client 236 system to be developed based on components on an open architecture language rather than a proprietary customer language or tool kit. This API incorporates a library of generic job steps, such as: download recipe, remote command, wait for event. These job steps perform standard business rules that are found among all semiconductor manufacturing facilities, allowing users to quickly configure for basic processing management, and minimizing the time required when interfacing with Manufacturing Execution System (MES) 210. The Director 238 API preferably also provides job cascading, which is a feature where jobs may be sequenced before processing resources are available. This allows jobs to be automatically started when resources become available, thereby improving throughput on critical processing tools.

In an alternative embodiment, the job management functionality exposed by the API is based on industry standards, such as SEMI E40 and E94. The creation of job recipes can be further enhanced by providing a GUI-based utility to facilitate job creation. Such a utility reduces the complexity and required integration time by providing a tool kit to generate XML based job specifications automatically.

Client 236 communicates with Equipment Server 240 via communication path 242. In a preferred embodiment, communication path 242 utilizes the Microsoft .NET communication framework. The use of a standardized interface for communication path 242 allows the development of custom components to the station controller in any .NET language, rather than a proprietary customer language or tool kit.

Equipment Server 240 communicates with Equipment 260 via communication path 265. In a preferred embodiment Equipment Server 240 is an equipment interface bridge (EIB) such as the Asyst/EIB product of Asyst Technologies, Inc. Communication path 265 can support any tool to server communication protocol, and in a preferred embodiment is compliant with Interface A, the new SEMI standards E120 (Common Equipment Model), E125 (Equipment Self Description), as well as established SEMI standards E4/5 (SECS), E30 (GEM) and E37 (HSMS).

Additionaly, developers can also connect unusual equipment types (e.g. that communicate through an ASCII-based ftp protocol) by creating a custom interface to Equipment Server 240.

Client 236 is dedicated to job management and control, allowing data consumers 270, 276, 282 and 288 to communicate directly with Equipment Server 240, effectively bypassing Client 236 for these applications. This eliminates the dependence of the data consumers on the job management client. Data consumer 270 is a statistical process control (SPC) client that utilizes data 272 and communicates with Equipment Server 240 via communication path 244, which utilizes the .NET framework in a preferred embodiment. Data consumer 276 is an Equipment Engineering Capability (EEC) client that utilizes data 278 and communicates with Equipment Server 240 via communication path 246, which utilizes HTTP/SOAP standards in a preferred embodiment. Data consumer 282 is an advanced process control (APC) client that utilizes data 284 and communicates with Equipment Server 240 via communication path 248, which utilizes HTTP/SOAP standards in a preferred embodiment. Data consumer 288 is a custom or proprietary data consumer that utilizes data 290 and communicates with Equipment Server 240 via communication path 250, which utilizes the .NET framework in a preferred embodiment.

Because Equipment 260 is decoupled from Client 236, through the use of Equipment Server 240, the data available can be expanded beyond that currently available in the SECS/GEM interface. Equipment Server 240 employs a tool model that insulates Client 236 from the direct communication with Equipment 260. This tool model provides a discoverable interface, allowing client applications to query the equipment's capabilities. The tool model concept also allows for the combination of multiple equipment into one logical unit, which is then grouped and managed internally, presenting it as one equipment to client applications.

Note that station controller functionality cannot be merely "canned" and replicated across different factories. Each factory has a significant number of unique business rules. Rather than having a static station controller that is appended with more and more custom rules, the architecture of the present invention provides a tool kit of the basic mandatory functionality required by station controllers, which can then be implemented as a thin-client application in a distributed environment.

The multi-client connectivity of the equipment server allows the core of the thin station controller client to focus on its specialty: job management controlling the processing of material in the factory. By separating job processing from data acquisition, data collection client applications can now focus on their own specific needs rather than those mandated by the legacy station controller. An additional advantage of this approach is that personnel providing solutions and support in this environment no longer need to be experts in all the areas previous station controllers supported.

Although traditional station controller implementations have been targeted for semiconductor fabrication facilities, the present invention is equally suited for assembly and test (often referred to as back-end) implementations.

The present invention has been described above in connection with several embodiments. This has been done for purposes of illustration only, and variations of the inventions will be readily apparent to those skilled in the art and also fall within the scope of the invention.

The invention claimed is:

1. A thin station controller client for automated job management comprising:
   a software library, which executes on a computer, including
      an application programming interface (API) supporting job management functions and including an interface to an equipment server supporting equipment communication functions, wherein said thin station controller client performs job cascading and communicates with said equipment server wherein
   said equipment server communicates with one or more tools and with
      a statistical control client (SPC) and a custom data consumer over separate communication paths that use the .NET framework and with
      an Engineering Equipment Capability (EEC) client and an advanced process control (APC) client over separate communication paths that use HTTP/SOAP protocols.

2. The thin station controller client of claim 1 wherein said job management functions includes support for the SEMI E40 and SEMI E94 standards.

3. The thin station controller client of claim 1 wherein said thin station controller client communicates with said equipment server utilizing the .NET communication framework.

4. The thin station controller client of claim 1 wherein said thin station controller client includes a Manufacturing Execution System (MES) handler.

5. The thin station controller client of claim 4 wherein said thin station controller client communicates with a Manufacturing Execution System (MES).

6. The thin station controller client of claim 1 wherein said thin station controller client includes a Recipe Management System (RMS) handler.

7. The thin station controller client of claim 6 wherein said thin station controller client communicates with a Recipe Management System (RMS).

8. A method for automated job management utilizing a thin station controller client comprising the operations of:

receiving at said thin station controller client job configuration information;
performing job cascading;
communicating job instructions based on said job configuration information from said thin station controller client to a job factory in an equipment server, wherein
said equipment server communicates with one or more tools and with
   a statistical control client (SPC) and a custom data consumer over separate communication paths that use the .NET framework and
   an Engineering Equipment Capability (EEC) client and an advanced process control (APC) client over separate communication paths that use HTTP/SOAP protocols; and
receiving from said equipment server job status information relating to at least one instantiated job based on said job instructions, wherein each operation of the method is executed by a computer.

9. The method of claim 8 wherein said job configuration information comprises XML formatted information.

10. The method of claim 8 further comprising the operation of job cascading after receiving client job configuration information.

11. The method of claim 8 wherein said job instructions and said job status comprise support for SEMI E40 and SEMI E94 standards.

12. The method of claim 8 wherein said thin station controller client and said equipment server communicate utilizing the .NET communication framework.

13. A method for automated job management utilizing a thin station controller client comprising the operations of:
receiving at said thin station controller client job configuration information;
performing job cascading;
communicating job instructions based on said job configuration information from said thin station controller client to a job factory in an equipment server, wherein
said equipment server communicates with one or more tools and with
   a statistical control client (SPC) and a custom data consumer over separate communication paths that use the .NET framework and
   an Engineering Equipment Capability (EEC) client and an advanced process control (APC) client over separate communication paths that use HTTP/SOAP protocols;
receiving from said equipment server job status information relating to at least one instantiated job based on said job instructions, wherein each operation of the method is executed by a computer.

* * * * *